(12) United States Patent
Gaskins et al.

(10) Patent No.: US 9,298,212 B2
(45) Date of Patent: Mar. 29, 2016

(54) DISTRIBUTED MANAGEMENT OF A SHARED CLOCK SOURCE TO A MULTI-CORE MICROPROCESSOR

(71) Applicant: VIA TECHNOLOGIES, INC., New Taipei (TW)

(72) Inventors: Darius D. Gaskins, Austin, TX (US); G. Glenn Henry, Austin, TX (US)

(73) Assignee: VIA TECHNOLOGIES, INC., New Taipei (TW)

( * ) Notice: Subject to any disclaimer, the term of this patent is extended or adjusted under 35 U.S.C. 154(b) by 320 days.

(21) Appl. No.: 14/143,666

(22) Filed: Dec. 30, 2013

(65) Prior Publication Data

US 2014/0164816 A1 Jun. 12, 2014

Related U.S. Application Data

(62) Division of application No. 13/299,225, filed on Nov. 17, 2011, now Pat. No. 8,631,256.

(60) Provisional application No. 61/426,470, filed on Dec. 22, 2010.

(51) Int. Cl.
*G06F 1/06* (2006.01)
*G06F 1/32* (2006.01)

(52) U.S. Cl.
CPC ............... *G06F 1/06* (2013.01); *G06F 1/3296* (2013.01); *Y02B 60/1285* (2013.01)

(58) Field of Classification Search
CPC .................................. G06F 1/06; G06F 1/3296
See application file for complete search history.

(56) References Cited

U.S. PATENT DOCUMENTS 4,748,559 A 5/1988 Smith et al.
5,467,455 A 11/1995 Gay et al.
(Continued)

FOREIGN PATENT DOCUMENTS

CN 101111814 1/2008
CN 101901177 12/2010

OTHER PUBLICATIONS

"Intel® Core™2 Extreme Quad-Core Mobile Processor and Intel® Core™2 Quad Mobile Processor on 45-nm Process." Datasheet. For platforms based on Mobile Intel® 4 Series Express Chipset Family. Jan. 2009 Document No. 320390-002 pp. 1-72.
(Continued)

*Primary Examiner* — Nimesh G Patel
(74) *Attorney, Agent, or Firm* — E. Alan Davis; James W. Huffman (57) ABSTRACT

Microprocessors are provided with decentralized logic and associated methods for indicating power related operating states, such as desired voltages and frequency ratios, to shared microprocessor power resources such as a voltage regulator module (VRM) and phase locked loops (PLLs). Each core is configured to generate a value to indicate a desired operating state of the core. Each core is also configured to receive a corresponding value from each other core sharing the applicable resource, and to calculate a composite value compatible with the minimal needs of each core sharing the applicable resource. Each core is further configured to conditionally drive the composite value off core to the applicable resource based on whether the core is designated as a master core for purposes of controlling or coordinating the applicable resource. The composite value is supplied to the applicable shared resource without using any active logic outside the plurality of cores.

16 Claims, 4 Drawing Sheets

(56) References Cited

U.S. PATENT DOCUMENTS

| | | | |
|---|---|---|---|
| 5,485,625 | A | 1/1996 | Gumkowski |
| 5,546,588 | A | 8/1996 | Deems et al. |
| 5,587,987 | A | 12/1996 | Okabe |
| 5,918,061 | A | 6/1999 | Nikjou |
| 6,496,880 | B1 | 12/2002 | Ma et al. |
| 6,665,802 | B1 | 12/2003 | Ober |
| 6,968,467 | B2 | 11/2005 | Inoue et al. |
| 7,257,679 | B2 | 8/2007 | Clark |
| 7,308,558 | B2 | 12/2007 | Arimilli et al. |
| 7,358,758 | B2 | 4/2008 | Gaskins et al. |
| 7,451,333 | B2 | 11/2008 | Naveh et al. |
| 7,467,294 | B2 | 12/2008 | Matsuoka et al. |
| 8,024,591 | B2 | 9/2011 | Bertelsen et al. |
| 8,046,615 | B2 | 10/2011 | Taguchi et al. |
| 8,103,816 | B2 | 1/2012 | Tiruvallur et al. |
| 8,214,632 | B2 | 7/2012 | Choi et al. |
| 8,358,651 | B1 | 1/2013 | Kadosh et al. |
| 8,359,436 | B2 | 1/2013 | Vash et al. |
| 2003/0202530 | A1 | 10/2003 | Jenkins et al. |
| 2004/0019827 | A1 | 1/2004 | Rohfleisch et al. |
| 2004/0117510 | A1 | 6/2004 | Arimilli et al. |
| 2005/0138249 | A1 | 6/2005 | Galbraith et al. |
| 2006/0171244 | A1 | 8/2006 | Ando |
| 2006/0224809 | A1 | 10/2006 | Gelke et al. |
| 2006/0282692 | A1 | 12/2006 | Oh |
| 2007/0070673 | A1 | 3/2007 | Borkar et al. |
| 2007/0143514 | A1 | 6/2007 | Kaushik et al. |
| 2007/0266262 | A1 | 11/2007 | Burton et al. |
| 2008/0129274 | A1 | 6/2008 | Komaki |
| 2009/0013217 | A1 | 1/2009 | Shibata et al. |
| 2009/0083516 | A1 | 3/2009 | Saleem et al. |
| 2009/0094481 | A1 | 4/2009 | Vera et al. |
| 2009/0172423 | A1 | 7/2009 | Song et al. |
| 2009/0222654 | A1 | 9/2009 | Hum et al. |
| 2009/0233239 | A1 | 9/2009 | Temchenko et al. |
| 2009/0240973 | A1* | 9/2009 | Muraki ............... G06F 1/08 713/503 |
| 2009/0307408 | A1 | 12/2009 | Naylor |
| 2009/0319705 | A1 | 12/2009 | Foong et al. |
| 2010/0026352 | A1* | 2/2010 | Jacobowitz ........... H03L 7/18 327/158 |
| 2010/0058078 | A1 | 3/2010 | Branover et al. |
| 2010/0138683 | A1 | 6/2010 | Burton et al. |
| 2010/0235672 | A1* | 9/2010 | Zhang ................. G06F 1/12 713/400 |
| 2010/0250821 | A1 | 9/2010 | Mueller |
| 2010/0325481 | A1 | 12/2010 | Dahan et al. |
| 2010/0332869 | A1 | 12/2010 | Hsin et al. |
| 2011/0119672 | A1* | 5/2011 | Ramaraju ........... G06F 9/5044 718/102 |
| 2011/0153984 | A1* | 6/2011 | Wolfe ................. G06F 1/324 712/42 |
| 2011/0185125 | A1 | 7/2011 | Jain et al. |
| 2011/0265090 | A1 | 10/2011 | Moyer et al. |
| 2011/0271126 | A1 | 11/2011 | Hill |
| 2011/0295543 | A1 | 12/2011 | Fox et al. |
| 2012/0005514 | A1 | 1/2012 | Henry et al. |
| 2012/0023355 | A1 | 1/2012 | Song et al. |
| 2012/0079290 | A1* | 3/2012 | Kumar ................. G06F 1/26 713/300 |
| 2012/0124264 | A1 | 5/2012 | Tiruvallur et al. |
| 2012/0161328 | A1 | 6/2012 | Henry et al. |
| 2012/0166763 | A1 | 6/2012 | Henry et al. |
| 2012/0166764 | A1 | 6/2012 | Henry et al. |
| 2012/0166832 | A1 | 6/2012 | Henry et al. |
| 2012/0166837 | A1 | 6/2012 | Henry et al. |
| 2012/0166845 | A1 | 6/2012 | Henry et al. |
| 2012/0239847 | A1 | 9/2012 | Gaskins |

OTHER PUBLICATIONS

"Intel® Atom™ Processor 330Δ Series." Datasheet. For systems based on Nettop Platform for '08. Revision 002. Feb. 2009. Document No. 320528-002. pp. 1-50.

"Intel® Core™2 Duo Processors and Intel® Core™2 Extreme Processors for Platforms Based on Mobile Intel® 965 Express Chipset Family." Datasheet. Jan. 2008. Document No. 316745-005. pp. 1-87.

"Intel® Core™ Duo Processor and Intel® Core™ Solo Processor on 65 nm Processs." Datasheet. Jan. 2007. Document No. 309221-006. pp. 1-91.

Richard, Michael Graham. "Intel's Next CPU to Include Dedicated 'Power Control Unit' to Save Power." Aug. 22, 2008. Downloaded from http://www.treehugger.com/files/2008/08/intel-cpu-processor-nehalem-i7-power-pcu.php on Jul. 14, 2010. pp. 1-4.

Naveh, Alon et al. "Power and Thermal Management in Intel® Core™ Duo Processor." Intel® Technology Journal. vol. 10, Issue 02, Published May 15, 2006. ISSN 1535-864X pp. 109-123.

Glaskowsky, Peter. "Investigating Intel's Lynnfield Mysteries." Mcall.com, CNET News, Speeds and Feeds. Sep. 21, 2009. Downloaded from http://mcall.com/8301-13512_3-10357328-23.html?tag=mncol;txt downloaded on Jul. 14, 2010. pp. 1-4.

Wasson, Scott. "Intel's Core i7 Processors; Nehalem Arrives with a Splash." The Tech Report. Nov. 3, 2008. Downloaded from http://techreport.com/articles.x/15818/1 on Jul. 14, 2010. pp. 1-11.

"Intel® QuickPath Architecture; A New System Architecture." White Paper Document No. 319725-001US. Mar. 2008 pp. 1-6.

Sartori, John et al. "Distributed Peak Power Management for Many-core Architectures." Published in Design, Automation & Test in Europe Conference & Exhibition, Apr. 2009, pp. 1556-1559.

* cited by examiner

DISTRIBUTED MANAGEMENT OF A SHARED CLOCK SOURCE TO A MULTI-CORE MICROPROCESSOR

CROSS REFERENCE TO RELATED APPLICATION(S)

This application is a divisional of U.S. patent application Ser. No. 13/299,225, filed Nov. 17, 2011, which claims priority based on U.S. Provisional Application, Ser. No. 61/426,470, filed Dec. 22, 2010, entitled MULTI-CORE INTERNAL BYPASS BUS, each of which is hereby incorporated by reference in its entirety.

This application is related to the following U.S. Patent Applications which are concurrently filed herewith, each of which is hereby incorporated by reference in its entirety.

| Serial Number | Filing Date | Title |
|---|---|---|
| 13/299,014 | Nov. 17, 2011 | MULTI-CORE INTERNAL BYPASS BUS |
| 13/299,059 | Nov. 17, 2011 | POWER STATE SYNCHRONIZATION IN A MULTI-CORE PROCESSOR |
| 13/299,122 | Nov. 17, 2011 | DECENTRALIZED POWER MANAGEMENT DISTRIBUTED AMONG MULTIPLE PROCESSOR CORES |
| 13/299,171 | Nov. 17, 2011 | RETICLE SET MODIFICATION TO PRODUCE MULTI-CORE DIES |
| 13/299,207 | Nov. 17, 2011 | DYNAMIC MULTI-CORE MICROPROCESSOR CONFIGURATION DISCOVERY |
| 13/299,239 | Nov. 17, 2011 | DYNAMIC AND SELECTIVE CORE DISABLEMENT AND RECONFIGURATION IN A MULTI-CORE PROCESSOR |

FIELD OF THE INVENTION

The present invention relates in general to the field of multi-core microprocessors, and particularly to management of resources, such as voltage and clock sources, shared by the multiple cores.

BACKGROUND OF THE INVENTION

A primary way in which modern microprocessors reduce their power consumption is to reduce the frequency and/or the voltage at which the microprocessor is operating. There are times when peak performance is required of the microprocessor such that it needs to be operating at its highest voltage and frequency. Other times, operating at more power-efficient voltages and frequencies is adequate. Accordingly, many modern microprocessors are capable of operating at many different voltages and/or frequencies. The well-known Advanced Configuration Power Interface (ACPI) Specification facilitates operating system-directed power management by defining power performance states, known as "P-states," that represent different voltage and frequencies for operating a microprocessor.

Performing power management actions is complicated by the fact that many modern microprocessors are multi-core processors in which multiple processing cores share one or more power management-related resources. For example, the cores may share voltage sources and/or clock sources. Furthermore, computing systems that include a multi-core processor also typically include a chipset that includes bus bridges for bridging the processor bus to other buses of the system, such as to peripheral I/O buses, and includes a memory controller for interfacing the multi-core processor to a system memory. The chipset may be intimately involved in the various power management actions and may require coordination between itself and the multi-core processor.

In early designs, the chipset was used to orchestrate power and thermal control. More recently, an article by Alon Naveh et al. entitled "Power and Thermal Management in the Intel Core Duo Processor" which appeared in the May 15, 2006 issue of the Intel Technology Journal, disclosed a power and thermal management architecture that uses an off-core hardware coordination logic (HCL), located in a shared region of the die or platform, that serves as a layer between the individual cores and shared resources on the die and platform. The HCL controls implementation of both ACPI C-states and P-states. More specifically, the HCL tracks P-state requests from both cores and calculates a CPU level target operating point that is either the higher or the lower performing of the two P-state requests, depending on whether the CPU is in a thermal control state.

In the scheme disclosed above, the HCL is centralized non-core logic outside the cores themselves that performs power management, including performance power state management, on behalf of all the cores. This centralized non-core logic solution may be disadvantageous, especially if the HCL is required to reside on the same die as the cores in that it may be yield-prohibitive due to large die sizes, particularly in configurations in which it would be desirable to include many cores on the die.

BRIEF SUMMARY OF INVENTION

In one aspect, the present invention provides a multi-die microprocessor with decentralized logic for indicating desired frequency operating states for each die of the microprocessor. Each die comprises a plurality of cores and a phase-locked loop (PLL). The PLL has a frequency ratio input, wherein the PLL is configured to generate a core clock signal for provision to each of the plurality of cores of the die. The core clock signal has a frequency that is a ratio of a frequency of a bus clock signal received by the microprocessor based on the frequency ratio input value. Each core is configured to generate a first frequency ratio value that indicates the desired frequency ratio of the core. Each core is also configured to receive the first frequency ratio value from the other cores of its die, using inter-core wires configured to convey the first frequency ratio values between the cores of the die, and to generate a second frequency ratio value which is the largest of the first frequency ratio values of all the cores of the die. Each core is configured to provide the second frequency ratio value to the PLL if the core is a master core of the die and to provide a zero value to the PLL if the core is not a master core of the die. The second frequency ratio value from the master core and the zero values from the non-master cores are wire-OR'ed together to generate the resultant frequency ratio input value to the PLL. The PLL frequency ratio input values are generated by the microprocessor without any active logic outside the plurality of cores.

In another aspect, the present invention provides a method for indicating desired frequency operating states, using decentralized logic, for each multi-core die of a multi-die microprocessor. Each core generates a first frequency ratio value that indicates the desired frequency ratio of the core, receives the first frequency ratio value from the other cores of the core's die, and generates a second frequency ratio value which is the largest of the first frequency ratio values of all the cores of the die. Each core also provides, as a requested frequency ratio output, the second frequency ratio value to the PLL, if the core is a master core of the die, and otherwise provides a zero value to the PLL. The respective requested frequency ratio outputs from each core are wire-OR'ed together on the die to generate a resultant frequency ratio input value to the PLL. Accordingly, each of the PLL frequency ratio input values is generated by the microprocessor without any active logic outside the plurality of cores.

In another aspect, the present invention provides a microprocessor. The microprocessor includes a plurality of dies. Each die includes a plurality of cores and a phase-locked loop (PLL), having a frequency ratio input. The PLL is configured to generate a core clock signal for provision to each of the plurality of cores of the die. The core clock signal has a frequency that is a ratio of a frequency of a bus clock signal received by the microprocessor based on a value of the frequency ratio input. Each core is configured to generate a first frequency ratio value that indicates the desired frequency ratio of the core and to receive the first frequency ratio value from the other cores of its die and to generate a second frequency ratio value which is the largest of the first frequency ratio values of all the cores of the die. Each core is configured to provide the second frequency ratio value to the PLL if the core is a master core of the die and to provide a zero value to the PLL if the core is not a master core of the die.

In another aspect, the present invention provides a method for operating a microprocessor comprising a plurality of dies each comprising a plurality of cores and a phase-locked loop (PLL) having a frequency ratio input, wherein the PLL is configured to generate a core clock signal for provision to each of the plurality of cores of the die, wherein the core clock signal has a frequency that is a ratio of a frequency of a bus clock signal received by the microprocessor based on a value of the frequency ratio input. The method includes generating, by each core, a first frequency ratio value that indicates the desired frequency ratio of the core. The method also includes receiving, by each core, the first frequency ratio value from the other cores of the core's die. The method also includes generating a second frequency ratio value which is the largest of the first frequency ratio values of all the cores of the die. The method also includes providing, by each core, the second frequency ratio value to the PLL, if the core is a master core of the die and otherwise providing a zero value to the PLL.

In another aspect, the present invention provides computer program product encoded in at least one non-transitory computer usable medium for use with a computing device, the computer program product comprising computer usable program code embodied in said medium for specifying a microprocessor. The computer usable program code includes program code for specifying a plurality of dies. Each die includes a plurality of cores and a phase-locked loop (PLL), having a frequency ratio input. The PLL is configured to generate a core clock signal for provision to each of the plurality of cores of the die. The core clock signal has a frequency that is a ratio of a frequency of a bus clock signal received by the microprocessor based on a value of the frequency ratio input. Each core is configured to generate a first frequency ratio value that indicates the desired frequency ratio of the core and to receive the first frequency ratio value from the other cores of its die and to generate a second frequency ratio value which is the largest of the first frequency ratio values of all the cores of the die. Each core is configured to provide the second frequency ratio value to the PLL if the core is a master core of the die and to provide a zero value to the PLL if the core is not a master core of the die.

DETAILED DESCRIPTION OF THE INVENTION

Described herein are embodiments of a system and method for managing power performance states, and more particularly, voltage and frequency states, on a multi-core processor, using decentralized, distributed logic that is resident and duplicated on each core. Before describing each of the Figures, which represent detailed embodiments, generally applicable concepts of the invention are introduced below.

As used herein, a multi-core processor generally refers to a processor comprising a plurality of enabled physical cores that are each configured to fetch, decode, and execute instructions conforming to an instruction set architecture. Generally, the multi-core processor is coupled by a system bus, ultimately shared by all of the cores, to a chipset providing access to peripheral buses to various devices.

The cores of the multi-core processor may be packaged in one or more dies that include multiple cores, as described in the section of Ser. No. 61/426,470, filed Dec. 22, 2010, entitled "Multi-Core Processor Internal Bypass Bus," and its concurrently filed nonprovisional (CNTR.2503), which are incorporated herein by reference. As set forth therein, a typical die is a piece of semiconductor wafer that has been diced or cut into a single physical entity, and typically has at least one set of physical I/O landing pads. For instance, some dual core dies have two sets of I/O pads, one for each of its cores. Other dual core dies have a single set of I/O pads that are shared between its twin cores. Some quad core dies have two sets of I/O pads, one for each of two sets of twin cores. Multiple configurations are possible.

Furthermore, a multi-core processor may also provide a package that hosts multiple dies. A "package" is a substrate on which dies reside or are mounted. The "package" is coupled by a chipset to a processor bus, and provides a single set of pins for connection to a motherboard and associated processor bus. The package's substrate includes wire nets or traces connecting the pads of the dies to shared pins of the package.

As stated above, the use of off-core, but on-die active hardware coordination logic (HCL) to implement power performance states is likely to result in more complicated, less symmetric, and lower-yielding die designs as well as scaling challenges. One alternative is to perform all needed coordination using the chipset itself, but this potentially requires each core to take control of the system bus in order to communicate an applicable value to the chipset, which may be resource-intensive. To overcome the disadvantages of both of these approaches, preferred embodiments of the present invention utilize sideband connections and passive logic between cores of the multi-core processor to generate values used to control the voltage and/or frequency supplied to the multi-core processor or component cores thereof. The sideband connections are not connected to the physical pins of the package; hence they do not carry signals off of the package; nor do communications exchanged through them burden the system bus. Also, relevant output signals from each core are fed into passive logic for generating pertinent composite values that are used to instruct relevant voltage and frequency-generating resources that are shared amongst cores of the microprocessor.

For example, as described in CNTR.2503, each die may provide bypass buses between cores of the die. These bypass buses are not connected to the physical pads of the die; hence they do not carry signals off the dual core die. They also provide improved quality signals between the cores, and, for the purposes for which they are used, enable the cores to communicate or coordinate with each other without using the system bus. Furthermore, as described in the section of Ser. No. 61/426,470, filed Dec. 22, 2010, entitled "Decentralized Power Management Distributed Among Multiple Processor Cores," and its concurrently filed nonprovisional (CNTR.2527), which are incorporated herein by reference, a package may provide inter-die communication lines between dies of a package. As explained in CNTR.2527, implementations of inter-die communication lines may require at least one additional physical output pad on each die. Nevertheless, implementation of embodiments of the present invention are expected to be less costly, and more scalable, than implementations that rely on off-core HCL or other active off-core logic to coordinate cores.

Figure 1:
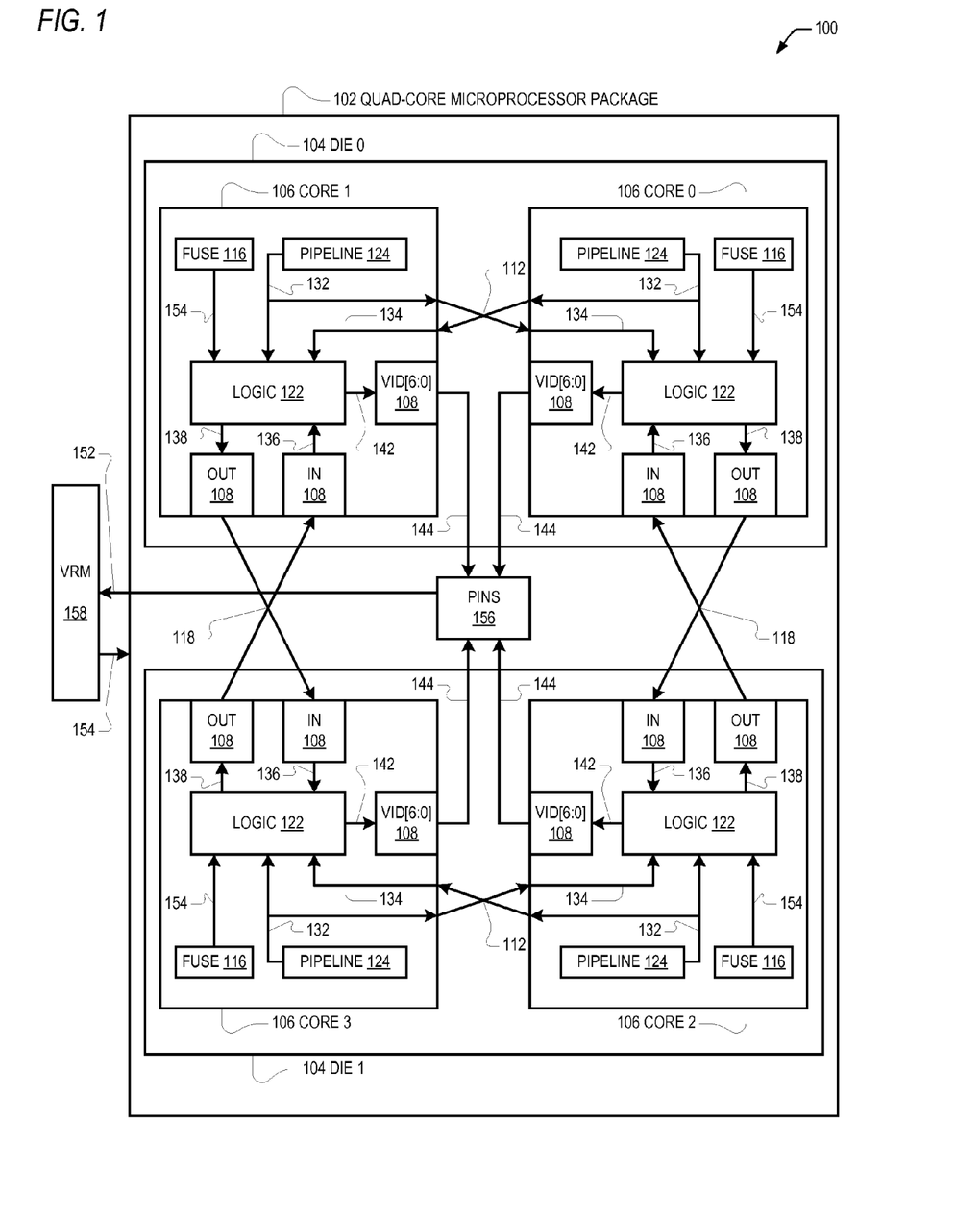
FIG. 1 is a block diagram illustrating a computing system including one embodiment of a multi-core microprocessor coupled to a single voltage regulator module.
Figure 3:
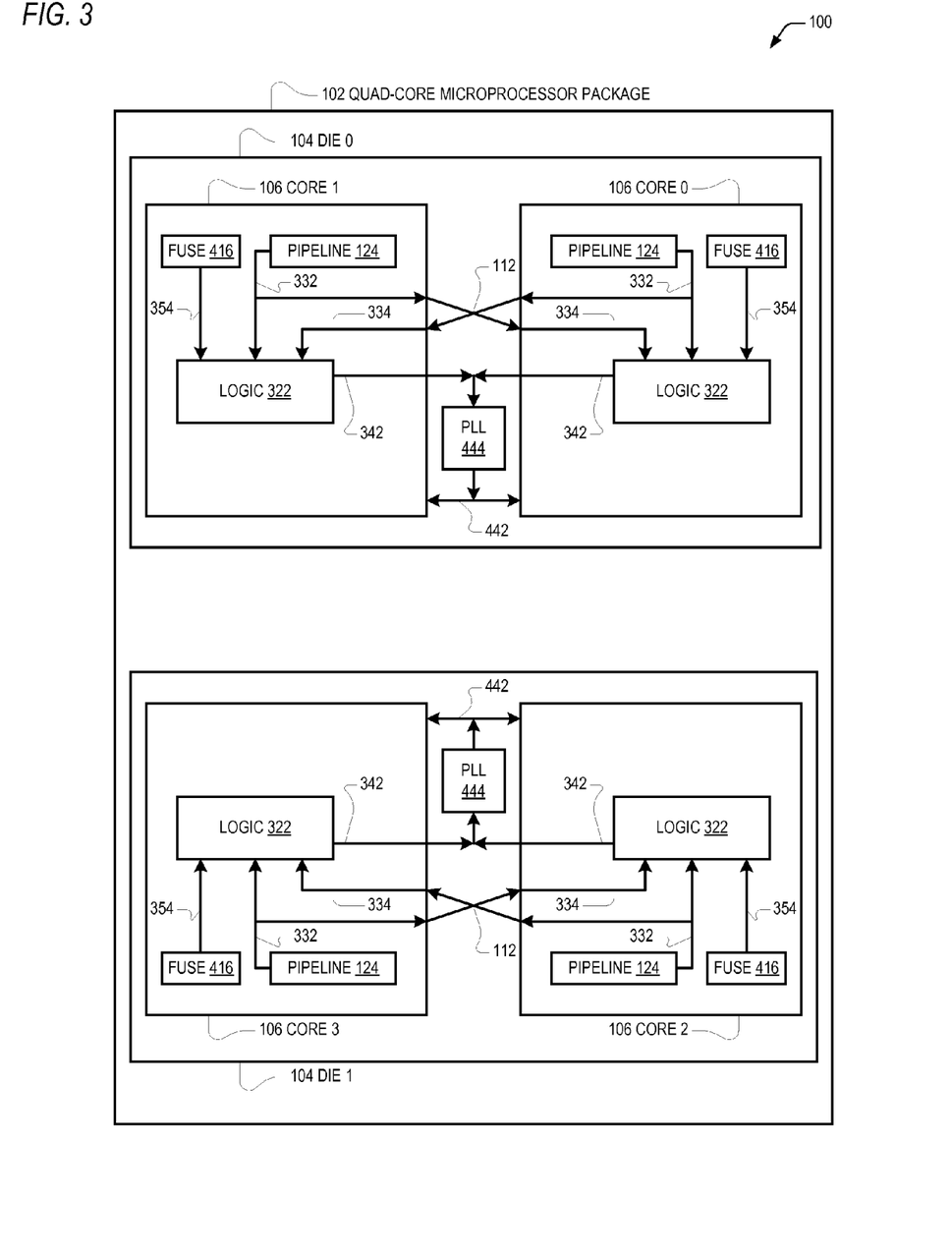
FIG. 3 is a block diagram illustrating a computing system including one embodiment of a multi-core microprocessor coupling the cores of each die to a respective PLL of the die.

Turning now to FIGS. 1 and 3, two block diagrams are provided illustrating aspects of one embodiment of a computing system 100 including a multi-core microprocessor 102. The multi-core microprocessor 102 comprises two semiconductor dies 104 configured as a single quad-core microprocessor package. The dies 104 are denoted die 0 and die 1. Each of the dies 104 includes two processing cores 106. The cores 106 in die 0 are denoted core 0 and core 1; the cores 106 in die 1 are denoted core 2 and core 3. To facilitate decentralized power management coordination activities between cores, each die provides inter-core communication wires 112 between its dies.

Each core includes a pipeline 124 of processing elements, such as an instruction cache, an instruction fetch unit, a branch prediction unit, an instruction translator or decoder, microcode, a register allocation table, general purpose and special registers, a data cache, reservation stations, execution units, a reorder buffer, and a retire unit. In various aspects, the cores 106 may be similar to cores described in CNTR.2527.

The dies 104 are mounted on a substrate of the package 102. The substrate includes wire nets (or simply "wires"), or traces. The traces connect pads of the dies 104 to pins of the package 102 and connect pads of the dies 104 to one another. The substrate also includes traces defining inter-die communication wires 118 that interconnect the dies 104 to facilitate communication between the cores 106 to perform decentralized power management coordination activities. In particular, inter-die communication wires 118 are provided to connect the IN pads 108 and OUT pads 108 of the various cores 106. In the embodiment of FIG. 1, the OUT pad 108 of core 0 is coupled to the IN pad 108 of core 2, and the OUT pad 108 of core 2 is coupled to the IN pad 108 of core 0, via the inter-die communication wires 118; and the OUT pad 108 of core 1 is coupled to the IN pad 108 of core 3, and the OUT pad 108 of core 3 is coupled to the IN pad 108 of core 1, via the inter-die communication wires 118.

To differentiate between the inter-core coordination activities made possible by the inter-core communication wires 112 and inter-die communication wires 118, the kinship terms "pal" and "buddy" are introduced herein. The term "pal" is used to refer to cores 106 on the same die 104 that communicate with one another via inter-core communication wires 112 (discussed more below); thus, in the embodiment of FIG. 1, core 0 and core 1 are pals, and core 2 and core 3 are pals. The term "buddy" is used herein to refer to complementary cores 106 on different dies 104 that communicate with one another via inter-die communication wires 118 (discussed more below); thus, in the embodiment of FIG. 1, core 0 and core 2 are buddies, and core 1 and core 3 are buddies.

It is noted that the kinship terms as defined herein differ subtly from the way the same kinship terms are generally defined in CNTR.2527. There, "buddy" generally referred to relationships between die masters. Here, "buddy" refers to all relationships between cores, which may or may not be die masters, connected by inter-die communication wires 118, wherein the cores are configured to drive signals on the inter-die communication wires 118 for the coordination purposes described herein.

The multi-core microprocessor 102 is operable to support an operating system instruction to switch to various operating points comprising different voltage and frequency settings (such as the well-known P-states, or performance states, such as via an MWAIT instruction) in response to workload, user input, or other events. Furthermore, the microprocessor itself may detect events and responsively vary its operating point to advantage, such as to reduce power consumption and/or increase performance.

As shown particularly in FIG. 1, the multi-core microprocessor 102 is coupled to a voltage regulator module (VRM) 158 that provides a power input 154 to the multi-core core microprocessor 102. In this embodiment, the VRM is a resource shared by all of the cores. The multi-core microprocessor 102 provides a voltage ID (VID) signal 152 that controls the VRM 158 to provide the desired voltage level on the power input 154. In one embodiment, the VID 152 is a seven-bit signal capable of specifying up to 128 different voltage levels. By adjusting the VID 152, the multi-core microprocessor 102 dynamically varies its power consumption level, since the amount of power consumed by the multi-core microprocessor 102 is a function of the voltage level 154, among other factors.

As shown particularly in FIG. 3, the multi-core microprocessor 102 also includes two phase locked loops (PLL) 444, one on each of dies 0 and 1. Each PLL 444 generates a core clock signal 442 provided to each of the cores 106 that share the PLL 444. By adjusting its operating frequency, the multi-core microprocessor 102 dynamically varies its performance level, since the number of instructions completed per second by the multi-core microprocessor 102 is a function of its frequency, among other factors. Typically, as the operating frequency increases, the operating voltage 154 is also increased to guarantee proper operation; conversely, as the frequency is decreased, the voltage 154 may be reduced to save power.

Each core includes decentralized logic for generating composite VID and frequency ratio signals for controlling the shared VRM and PLLs. In the paragraphs below, logic is described first for generating a composite VID for controlling the VRM and second for generating composite frequency ratio signals for controlling the PLLs.

Each core 106 includes VID generation logic 122 coupled to the pipeline 124. First, the VID generation logic 122 receives a my-core-vid signal 132 that indicates the VID value desired by the core 106. In one embodiment, the microcode of the core 106 writes the core 106 VID value to a control register of the core 106 which is provided via my-core-vid signal 132 to the VID generation logic 122.

Focusing next on VID coordination with pals or cores of the same die, the logic VID generation 122 receives a pal-vid signal 134 that indicates the VID value desired by the core's 106 pal core 106. The VID generation logic 122 also provides the my-core-vid 132 to its pal core 106 via inter-core communication wires 112, which becomes the pal-vid input 134 to the pal core 106. From these values, the VID generation logic 122 computes a composite VID value, which is the largest, or maximum, VID value of all of the relevant cores.

Focusing next on VID coordination between buddies, after each of the cores 106 has determined the composite VID value for its die 104, it serially communicates its composite die 104 VID value to its buddy core 106 via the inter-die communication wires 118. More particularly, the VID generation logic 122 provides a my-die-vid-serial signal 138 to an OUT pad 108 of the core 106, which indicates the composite VID value of the instant die 104. The VID generation logic 122 of each core 106 then receives a buddy-vid-serial signal 136 from an IN pad 108 of the core 106. The buddy-vid-serial signal 136 indicates the composite VID value of the die 104 that contains the buddy core 106. To reiterate, the composite VID value of the instant die 104 is the maximum VID value of all the cores 106 on the instant die 104; and the composite VID value received from the buddy core 106 is the maximum VID value of all the cores 106 on the die 104 that contains the buddy core 106.

Before discussing generation of a composite VID value for the quad-core microprocessor package, it is noted that the multi-core microprocessor 102 has a designated master core 106. The designated master core is uniquely authorized to drive the VID value that controls the VRM 158. In one embodiment, each core 106 includes a configuration fuse 116. The manufacturer of the die 104 selectively blows the configuration fuses 116 such that one of the cores 106 is designated the master core and the other cores 106 are not. The fuse 116 provides its value on a fuse-do-not-drive signal 154.

In other embodiments, a programmable internal register or configuration storage logic, either replacing the fuse 116 or coupled between the fuse 116 and the VID generation logic 122, indicate a core's master credentials, if any. System firmware, for example, may subsequently write to an applicable internal register to override the default fuse 116 value to dynamically configure the master core 106, as described in the section of Ser. No. 61/426,470, filed Dec. 22, 2010, entitled "Dynamic and Selective Core Disablement in a Multi-Core Processor," and its concurrently-filed non-provisional (CNTR.2536), which are incorporated herein by reference. It will be appreciated that the VID generation logic 122 fully supports a configuration that designates a core not previously designated as a master as a master or provisional master, or that removes such a designation from a core.

Focusing next on generation of a composite VID value, the VID generation logic 122 receives the fuse-do-not-drive signal 154 from the fuse 116 (or an equivalent signal from other internal credential-indicating logic). The VID generation logic 122 then the composite VID value of the multi-core microprocessor 102 package, which is the maximum VID value of all the cores 106 on the multi-core microprocessor 102.

Incidentally, each individual my-core-vid VID value may be a function, at least in part, of the frequency at which the core 106 is operating. In one embodiment, each die 104 is capable of operating at a different frequency, and in another embodiment each core 106 is capable of operating at a different frequency. As alluded to above, each frequency at which a core 106 may operate is typically associated with a corresponding minimum voltage level to be supplied to the core 106 in order to guarantee proper operation of the core 106 at the frequency. Thus, where all of the cores 106 of the multi-core microprocessor 102 share the same voltage level 154, the composite VID value for the multi-core microprocessor 102 is, in one embodiment, the maximum VID value desired by all the cores 106 in order to guarantee proper operation. This is accomplished collectively by the VID generation logic 122 of all the cores 106 in a decentralized, distributed fashion as described in more detail below with respect to FIG. 2.

Next, depending on whether the core 106 is designated as the master core for purposes of VRM coordination and/or control, the VID generation logic 122 conditionally drives the composite VID value for the package as pkg-vid signal 142 to VID pads 108 of the core 106. If the core 106 is not designated as the master core, then, as explained in more detail in connection with FIG. 2, it drives a false pkg-vid signal 142 comprising zeros onto the VID pads 108.

Focusing next on transmission of a composite VID value to the VRM, the multi-core microprocessor package 102 provides VID pins 156 that provide respective VID signals 152 to the VRM. Additionally, the VID pads 108 of each core 106 are coupled to the respective VID pins 156 of the package by package substrate traces 144. In one embodiment, VID traces 144 from each set of VID pads 108 are wire-OR'ed together on the package substrate.

Figure 2:
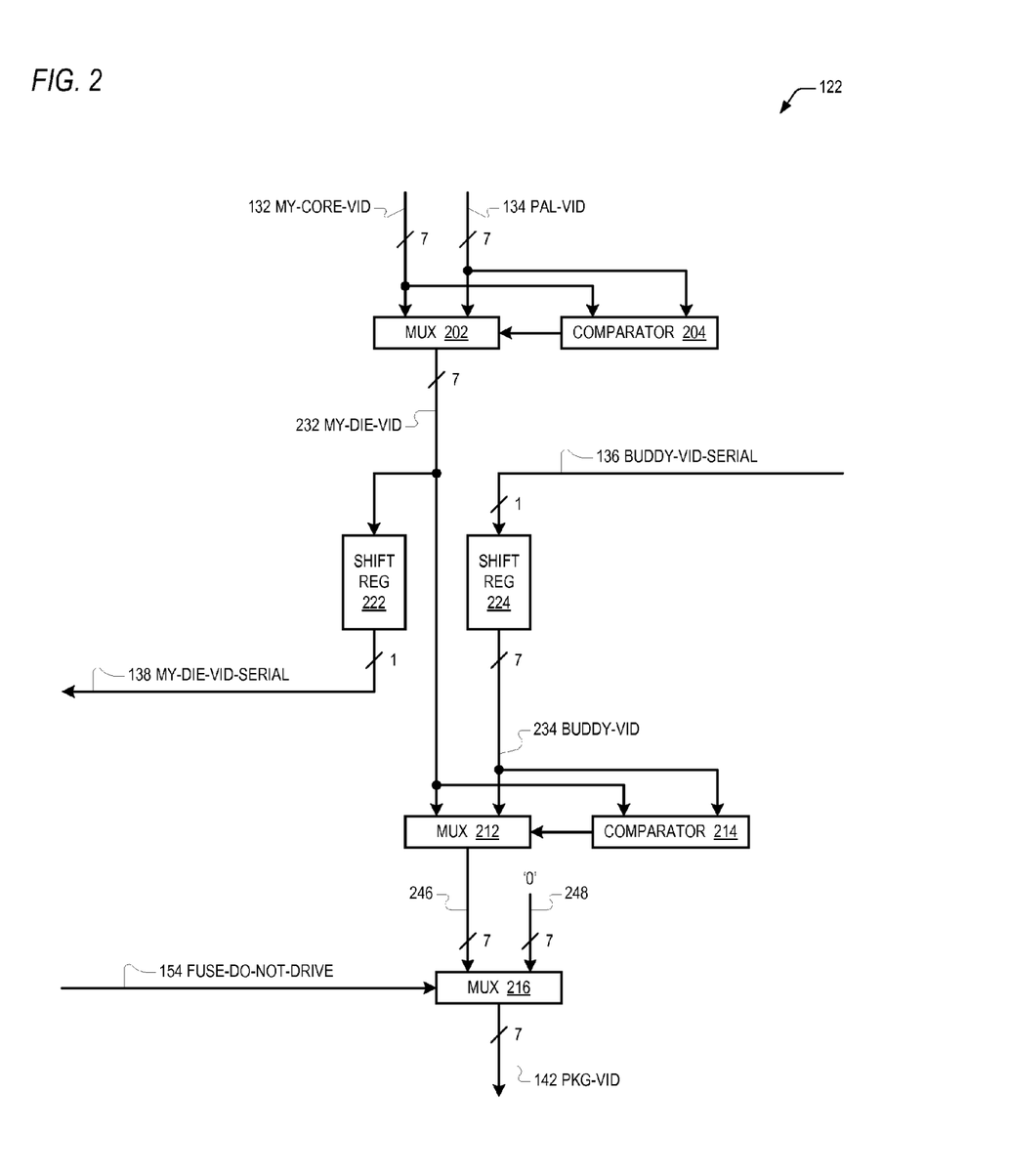
FIG. 2 is a block diagram illustrating one embodiment of decentralized logic incorporated into each core of the multi-core processor of FIG. 1 for generating a package VID value for the microprocessor.

Referring now to FIG. 2, a block diagram illustrating in more detail the logic VID generation 122 of FIG. 1 according to the present invention is shown. The VID generation logic 122 includes a two-input mux 202 and a two-input comparator 204, each of which receives the my-core-vid signal 132 and the pal-vid signal 134 on respective data inputs. The comparator 204 compares the my-core-vid signal 132 and the pal-vid signal 134 and generates a signal to control mux 202 to select the larger of the two inputs, which mux 202 provides on its output as my-die-vid signal 232. Thus, my-die-vid 232 is the composite VID value of the instant core 106 and its pal core 106.

The my-die-vid signal 132 is provided to the parallel data input of a shift register 222. When so directed, the shift register 222 serially shifts out the my-die-vid 132 value on my-die-vid-serial signal 138 to the OUT pad 108 of the core 106. Thus, the core 106 serially communicates its composite die 104 VID value via its OUT pad 108 to its buddy core 106.

Conversely, the core 106 serially receives the composite die 104 VID value of the die 104 that contains its buddy core 106 on buddy-vid-serial signal 136 via its IN pad 114 into the serial input of a second shift register 224. The shift register 224 outputs a parallel form (e.g., 7 bit value) of the received buddy-vid-serial 136 value as buddy-vid signal 234.

A second two-input mux 212 and a second two-input comparator 214 each receive the my-die-vid signal 232 and the buddy-vid signal 234 on respective data inputs. The comparator 214 compares the my-die-vid signal 232 and the buddy-vid signal 234 and generates a signal to control mux 212 to select the larger of the two inputs, which mux 212 provides on its output as VID value signal 246. Thus, VID value 246 is the composite VID value of all the cores 106 in the multi-core microprocessor 102.

A third two-input mux 216 receives output 246 on one input and zeros 248 on the other input. The fuse-do-not-drive signal 154 controls the mux 216. If the fuse-do-not-drive signal 154 is false, the mux 216 selects the VID value from input 246 to provide on the pkg-vid 142 output; otherwise, the mux 216 selects the zeros 248 so that zeros will be driven onto the VID signals 144 via the VID pads 108, which enables the master core 106 of the multi-core microprocessor 102 to drive the true composite VID value onto the VID pins 156 and on to the VRM 158. Thus, the composite pkg-vid 142 value generated by a core 106 will be zero unless the core 106 is configured to drive its VID value to the VID pads 108 and to the VID pins 156 to the VRM 158.

Because the package substrate is configured to wire-OR the pkg-vid 142 signals received from each of the cores 106 together, and because the pkg-vid 142 signals provided by any given core 106 are zero unless that core 106 is the master core, the microprocessor 102 always supplies a true composite VID value to the VRM.

Although the function of the VID generation logic 122 is performed in the embodiment of FIG. 2 using particular devices, such as muxes and comparators and Boolean logic gates, it should be understood that other combinatorial and sequential logic circuits may be employed to perform the same functions.

As mentioned above, in one embodiment, each die 104 is also capable of operating at a frequency independent of a frequency at which another die 104 is operating. In such an embodiment, the pal cores 106 on a die 104 communicate with one another via the inter-core communication wires 112, and each core 106 includes frequency ratio request generation logic 322 shown in FIG. 3 to compute a die composite clock ratio value 342 (denoted die-freq 342 in FIG. 3) that the master core 106 of a die 104 drives to a shared phase-locked loop (PLL) 444 of the die 104 that generates a common core clock signal 442 to each core 106 of the die 104, as shown in the microprocessor 100 of FIG. 3. In one such embodiment, the frequency ratio request generation logic 322 is configured to select the last requested frequency, rather than the maximum desired frequency.

Referring now to FIG. 3, a block diagram illustrating a computing system 100 including a multi-core microprocessor 102 according to the present invention is shown. The system 100 is similar to the system 100 of FIG. 1; however, differences will now be described. FIG. 3 shows a PLL 444 included in die 0 and shared by core 0 and core 1, and a PLL 444 included in die 2 and shared by core 2 and core 3. Each PLL 444 generates a core clock signal 442 provided to each of the cores 106 that share the PLL 444. The frequency of the core clock signal 442 is a function of a wired-OR result of the die-freq 342 value (discussed more below) from each core 106 of the die 104.

Each core 106 provides frequency ratio request generation logic 322 that receives a my-core-freq signal 332 that indicates the frequency ratio value desired by the core 106 (i.e., the desired ratio of the bus clock frequency to be the core clock 442 frequency). In one embodiment, the microcode of the core 106 writes the desired core 106 frequency ratio value to a control register of the core 106 which is provided via my-core-freq signal 332 to the frequency ratio request generation logic 322.

To coordinate with its pal core 106, the frequency ratio request generation logic 322 provides the my-core-freq 332 to its pal core 106 via inter-core communication wires 112. The my-core-freq 332 becomes the pal-freq input 334 to the pal core 106. In symmetric fashion, the frequency ratio request generation logic 322 also receives a pal-freq signal 334 that indicates the frequency ratio value desired by the core's 106 pal core 106.

The frequency ratio request generation logic 322 then composite frequency ratio value of the die 104. The composite frequency ratio value of the die 104 is the maximum frequency ratio value of all the cores 106 on the die 104, according to one embodiment, and is the last requested frequency ratio according to another embodiment.

Depending on whether the core 106 is credentialed as a master core for purposes of PLL control, the frequency ratio request generation logic 322 conditionally provides the composite frequency ratio value of the die 104 to the PLL 444 via a die-freq signal 342. If the core 106 is not designated as the master core of the die 104 for purposes of PLL control, then, as also explained in more detail in connection with FIG. 4, it drives a false die-freq signal 142, comprising zeros, to the PLL 444.

To indicate to the frequency ratio request generation logic 322 whether the core 106 is credentialed as a master for PLL control purposes, FIG. 3 shows a configuration fuse 416. The fuse 416 (or the alternative logic described herein) provides its value on a fuse-do-not-drive-freq signal 354 to frequency ratio request generation logic 322.

In one embodiment, the manufacturer of the die 104 selectively blows the configuration fuse 416 such that one of the cores 106 of a die 104 is designated the master core of the die 104 for frequency control purposes (which may be independent of any master designation provided for voltage control purposes) and the other cores 106 are not. In other embodiments, consistent with the explanation provided in connection with FIG. 1, a programmable internal register or configuration storage logic may either replace the configuration fuse 416 or be coupled between the fuse 416 and the frequency ratio request generation logic 322, to indicate a core's master credentials, if any, with respect to PLL control. It will be appreciated that the frequency ratio request generation logic 322 fully supports a configuration that designates as master or as a provisional master a core not previously designated as a master, or that removes such a designation from a core.

In one embodiment, the die-freq signals 342 from each core 106 are wire-OR'ed together on the die 104, with its result provided to the shared PLL 444. Because the die is configured to wire-OR the die-freq signals 342 signals received from each of the cores 106 together, and because the die-freq 342 signals provided by any given core 106 are zero unless that core 106 is the master core, the die 104 always supplies a true composite frequency ratio value to the PLL 444.

Figure 4:
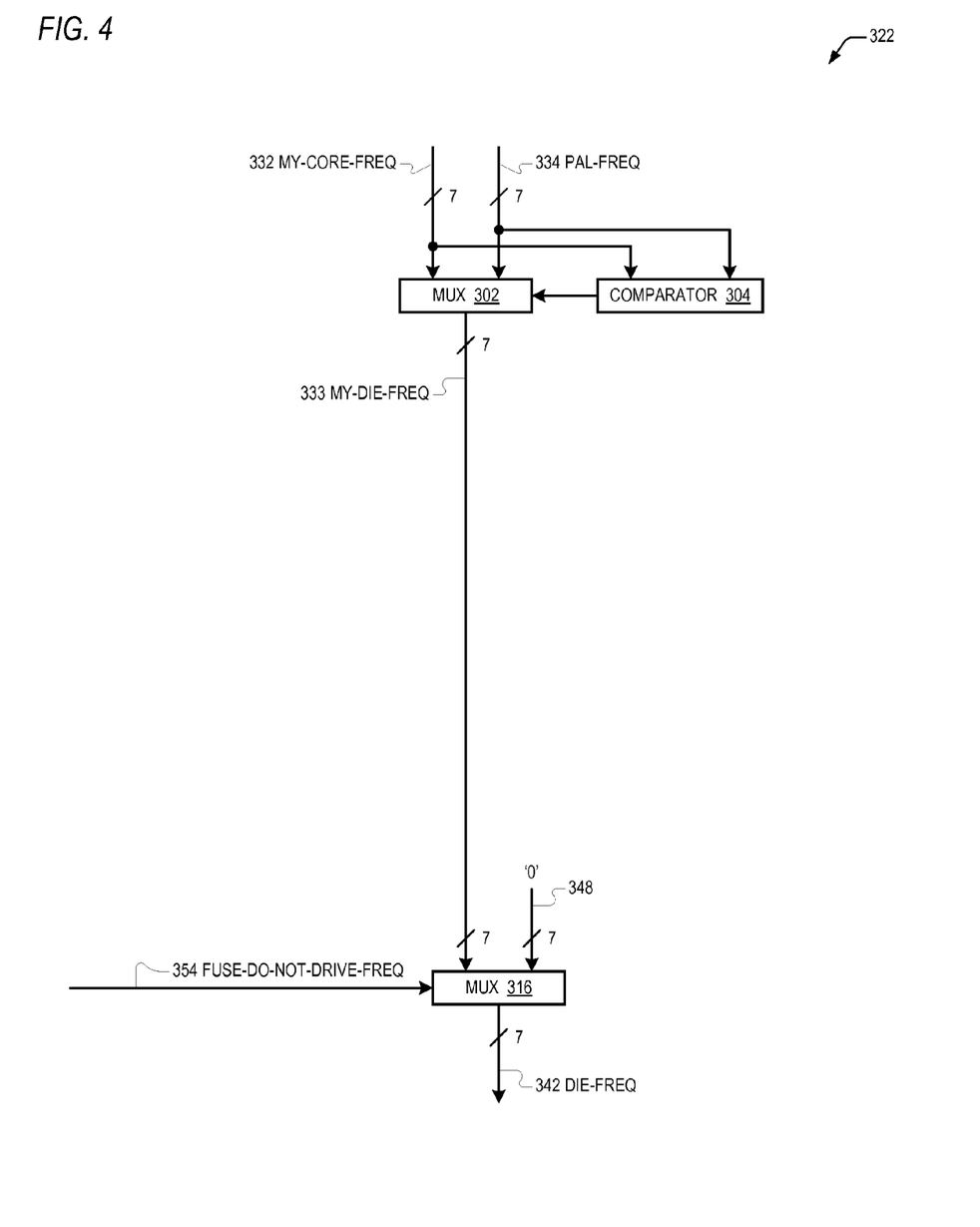
FIG. 4 is a block diagram illustrating one embodiment of decentralized logic incorporated into each core of a multi-core processor of FIG. 3 for generating a requested frequency ratio for the core's applicable die.

Referring now to FIG. 4, frequency ratio request generation logic 322 is illustrated for coordinating the requested frequencies of the cores 106 of each die 104 in order to control a shared PLL of the die 104. The frequency ratio request generation logic 322 includes a two-input mux 302 and a two-input comparator 304, each of which receives the my-core-freq signal 332 and the pal-freq signal 334 on respective data inputs. The comparator 304 compares the my-core-freq signal 332 and the pal-freq signal 334 and generates a signal to control mux 302 to select the larger of the two inputs, which mux 302 provides on its output as my-die-freq signal 333. Thus, my-die-freq 333 is the composite frequency ratio value of the instant core 106 and its pal core 106.

A second two-input mux 316 receives the my-die-freq signal 333 on one input and zeros 348 on the other input. The fuse-do-not-drive-freq signal 354 controls the mux 316. If the fuse-do-not-drive-freq signal 354 is false, the mux 316 selects the frequency ratio value from input 333 to provide on the die-vid 342 output; otherwise, the mux 316 selects the zeros 348 so that zeros will be driven onto the die-freq signal 342, which enables the master core 106 of the die 104 to drive the true composite frequency ratio value to the shared PLL 444. Thus, the composite die-freq 342 value generated by a core 106 will be zero unless the core 106 is configured to drive its frequency ratio value to PLL 444.

Although the function of the frequency ratio request generation logic 322 is performed in the embodiment of FIG. 4 using particular devices, such as muxes and comparators and Boolean logic gates, it should be understood that other combinatorial and sequential logic circuits may be employed to perform the same functions.

Also, it should be noted that embodiments of cores may include both the frequency ratio request generation logic 322 for coordinating control of the shared PLLs 444 and VID generation logic 122 for coordinating control of the shared VRM 158, which is not shown in FIG. 4.

Also, corresponding embodiments are contemplated for a wide range of microprocessor configurations, as illustrated for example in CNTR.2527, as well as for reconfigurable microprocessors, as illustrated for example in CNTR.2536.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
    a plurality of dies, each die comprising:
        a plurality of cores; and
        a phase-locked loop (PLL), having a frequency ratio input, wherein the PLL is configured to generate a core clock signal for provision to each of the plurality of cores of the die, wherein the core clock signal has a frequency that is a ratio of a frequency of a bus clock signal received by the microprocessor based on a value of the frequency ratio input;
    wherein each core is configured to generate a first frequency ratio value that indicates the desired frequency ratio of the core and to receive the first frequency ratio value from the other cores of its die and to generate a second frequency ratio value which is the largest of the first frequency ratio values of all the cores of the die; and
    wherein each core is configured to provide the second frequency ratio value to the PLL if the core is a master core of the die and to provide a zero value to the PLL if the core is not a master core of the die.

2. The microprocessor of claim 1, wherein the second frequency ratio value from the master core and the zero values from the non-master cores are wire-OR'ed together to generate the resultant frequency ratio input value to the PLL.

3. The microprocessor of claim 1, wherein each core comprises:
    a fuse that indicates whether the core is the master core of the die.

4. The microprocessor of claim 1, wherein each die comprises:
    inter-core wires configured to convey the first frequency ratio values between the cores of the die.

5. The microprocessor of claim 1, wherein each of the PLL frequency ratio input values is generated by the microprocessor without any active logic outside the plurality of cores.

6. A method for operating a microprocessor comprising a plurality of dies each comprising a plurality of cores and a phase-locked loop (PLL) having a frequency ratio input, wherein the PLL is configured to generate a core clock signal for provision to each of the plurality of cores of the die, wherein the core clock signal has a frequency that is a ratio of a frequency of a bus clock signal received by the microprocessor based on a value of the frequency ratio input, the method comprising:
    generating, by each core, a first frequency ratio value that indicates the desired frequency ratio of the core;
    receiving, by each core, the first frequency ratio value from the other cores of the core's die;
    generating a second frequency ratio value which is the largest of the first frequency ratio values of all the cores of the die; and
    providing, by each core, the second frequency ratio value to the PLL, if the core is a master core of the die and otherwise providing a zero value to the PLL.

7. The method of claim 6, further comprising:
    wire-OR'ing together the second frequency ratio value from the master core and the zero values from the non-master cores are to generate a resultant frequency ratio input value to the PLL.

8. The method of claim 6, wherein each core comprises:
    indicating, via a fuse of each core, whether the core is the master core of the die.

9. The method of claim 6, further comprising:
    conveying the first frequency ratio values between the cores of the die via inter-core wires.

10. The method of claim 6, wherein each of the PLL frequency ratio input values is generated by the microprocessor without any active logic outside the plurality of cores.

11. A computer program product encoded in at least one non-transitory computer usable medium for use with a computing device, the computer program product comprising:
    computer usable program code embodied in said medium, for specifying a microprocessor, the computer usable program code comprising:
        program code for specifying a plurality of dies, each die comprising:
            a plurality of cores; and
            a phase-locked loop (PLL), having a frequency ratio input, wherein the PLL is configured to generate a core clock signal for provision to each of the plurality of cores of the die, wherein the core clock signal has a frequency that is a ratio of a frequency of a bus clock signal received by the microprocessor based on a value of the frequency ratio input;

wherein each core is configured to generate a first frequency ratio value that indicates the desired frequency ratio of the core and to receive the first frequency ratio value from the other cores of its die and to generate a second frequency ratio value which is the largest of the first frequency ratio values of all the cores of the die; and wherein each core is configured to provide the second frequency ratio value to the PLL if the core is a master core of the die and to provide a zero value to the PLL if the core is not a master core of the die.

12. The computer program product of claim 11, wherein the second frequency ratio value from the master core and the zero values from the non-master cores are wire-OR'ed together to generate the resultant frequency ratio input value to the PLL.

13. The computer program product of claim 11, wherein each core comprises:
   a fuse that indicates whether the core is the master core of the die.

14. The computer program product of claim 11, wherein each die comprises:
   inter-core wires configured to convey the first frequency ratio values between the cores of the die.

15. The computer program product of claim 11, wherein each of the PLL frequency ratio input values is generated by the microprocessor without any active logic outside the plurality of cores.

16. The computer program product of claim 11, wherein the at least one non-transitory computer usable medium is selected from the set of a disk, tape, or other magnetic, optical, or electronic storage medium.

* * * * *